(12) United States Patent
Kosuge et al.

(10) Patent No.: US 7,332,196 B2
(45) Date of Patent: Feb. 19, 2008

(54) COMPOSITE COMPRISING HEAT-RESISTANT FIBER AND SILOXANE POLYMER

(75) Inventors: Kazuhiko Kosuge, Tokyo (JP); Hideo Nakamura, Kawasaki (JP); Tsutomu Yamamoto, Otsu (JP); Yoko Iwamiya, Yokohama (JP); Osamu Yagi, Yokohama (JP)

(73) Assignees: Kazari-Ichi Co., Ltd., Kanagawa (JP); Sakase Adtech Co., Ltd., Fukui (JP)

( * ) Notice: Subject to any disclaimer, the term of this patent is extended or adjusted under 35 U.S.C. 154(b) by 0 days.

(21) Appl. No.: 10/509,080

(22) PCT Filed: Mar. 28, 2003

(86) PCT No.: PCT/JP03/04053

§ 371 (c)(1),
(2), (4) Date: Dec. 1, 2004

(87) PCT Pub. No.: WO03/083206

PCT Pub. Date: Oct. 9, 2003

(65) Prior Publication Data

US 2005/0165154 A1    Jul. 28, 2005

(30) Foreign Application Priority Data

Mar. 29, 2002  (JP) ............... 2002-095983
Jan. 14, 2003  (JP) ............... 2003-005624
Jan. 14, 2003  (JP) ............... 2003-005626

(51) Int. Cl.
*B32B 27/34* (2006.01)

(52) U.S. Cl. ............ 427/387; 106/287.12; 106/287.14; 528/17; 528/18; 428/365; 428/395

(58) Field of Classification Search ............... 427/387; 106/287.14, 287.12; 528/17, 18; 428/365, 428/385

See application file for complete search history.

(56) References Cited

U.S. PATENT DOCUMENTS

| | | | |
|---|---|---|---|
| 3,628,985 A * | 12/1971 | Hider et al. ............... 427/228 |
| 3,654,058 A * | 4/1972 | Jasinski et al. ............. 442/249 |
| 4,076,684 A | 2/1978 | Wohlfarth et al. |
| 4,246,313 A * | 1/1981 | Stengle, Jr. ................ 442/136 |
| 4,640,951 A | 2/1987 | Skostins |
| 4,750,443 A * | 6/1988 | Blaustein et al. ........... 112/420 |
| 5,002,637 A | 3/1991 | Toyoshima et al. |
| 5,292,799 A * | 3/1994 | Naito et al. ................. 524/783 |
| 5,578,368 A * | 11/1996 | Forsten et al. .............. 442/407 |
| 5,656,690 A | 8/1997 | Pradl et al. |
| 5,661,198 A | 8/1997 | Inatani et al. |
| 5,705,445 A | 1/1998 | Chikaraishi et al. |
| 5,736,619 A * | 4/1998 | Kane et al. ................. 525/393 |
| 6,268,300 B1 | 7/2001 | Hernandez et al. |
| 6,638,572 B1 * | 10/2003 | Inglefield ................. 427/376.2 |

FOREIGN PATENT DOCUMENTS

| | | |
|---|---|---|
| DE | 42 26 841 | 2/1994 |
| EP | 0 057 908 | 8/1982 |
| EP | 0 275 386 | 7/1988 |
| EP | 0 924 444 | 6/1999 |
| EP | 0930393 | 7/1999 |
| EP | 0 990 512 | 4/2000 |
| EP | 1 059 383 | * 12/2000 |
| EP | 1 179 633 | * 2/2002 |
| EP | 1179633 | 2/2002 |
| JP | 50-142900 | 11/1975 |
| JP | 3-287869 | 12/1991 |
| JP | 09-111187 | 4/1997 |
| JP | 2000-96387 | 4/2000 |
| JP | 2001-164441 | 6/2001 |
| JP | 2001-172880 | 6/2001 |
| TW | 387958 | 4/2000 |
| TW | 422856 | 2/2001 |
| WO | 97/01595 | 1/1997 |

OTHER PUBLICATIONS

Database WPI, Section Ch, Week 199223, Derwent Publications Ltd., London, GB; Class A18, AN 1992-187768 XP002360239 & JP 04 119224 A, Apr. 20, 1992.
Database WPI, Section Ch, Week 199629, Derwent Publications Ltd., London, GB; Class A26, AN 1996-281127 XP002360240 & JP 08 117368 A, May 14, 1996.

* cited by examiner

*Primary Examiner*—Margaret G. Moore
(74) *Attorney, Agent, or Firm*—Wenderoth, Lind & Ponack L.L.P.

(57) ABSTRACT

The present invention provides a fiber-reinforced glass having excellent heat resistance and toughness, or a composite comprising a heat-resistant fiber and a siloxane polymer, which has a modified surface structure and is useful as a heat-resistant fiber.

8 Claims, 1 Drawing Sheet

COMPOSITE COMPRISING HEAT-RESISTANT FIBER AND SILOXANE POLYMER

TECHNICAL FIELD

This application is a U.S. national stage of International Application No. PCT/JP03/04053 filed Mar. 28, 2003.

TECHNICAL FIELD

The present invention relates to a composite comprising a heat-resistant fiber and a siloxane polymer. More particularly, the present invention relates to a fiber-reinforced glass containing a heat-resistant fiber and a siloxane polymer as a constituent component, and a heat-resistant fiber, a representative of which is an aramid fiber firmly covered with an organic and inorganic hybrid glassy film.

BACKGROUND ART

Since a fiber-reinforced composite comprising a fiber and a matrix resin is light and excellent in chemical property, it has been applied in various uses in recent years. With expansion of use, a fiber-reinforced composite is required for various physical properties, and one of them is improvement in heat resistance.

As a heat resistant fiber-reinforced composite, a composite using a polyimide resin as a matrix resin is known (see. JP-A No. 5-9312 (page (2), lines 34 to 39)). A heat resistance temperature of a polyimide resin is about 300° C. In order to further improve heat resistance, use of a ceramic matrix is also known (see. JP-A No. 9-100174 (claim 1, etc.)). A heat resistance temperature of a ceramic matrix is about 1000° C. In addition, as a fiber-reinforced composite excellent in heat resistance, there is also a carbon fiber-reinforced composite. A carbon fiber-reinforced composite is obtained by burning a carbon fiber-reinforced plastic in inert atmosphere at a high temperature, and carbonizing a plastic as a matrix (see JP-A No. 6-191943 (claim 1, etc.)).

However, when a polyimide resin is used as a matrix resin, there is a problem that a melting temperature of a polyimide resin is high. When a melting temperature is high, it is difficult to adhere an interface between a fiber and a matrix resin due to a difference between a thermal expansibility of a matrix resin and a thermal expansibility of a fiber. In addition, there is also a problem that, in order to cure a polyimide resin, a high temperature is required. When a curing temperature of a matrix resin is high, there is a possibility that oxidative deterioration of a fiber is caused, and a further heat resistant apparatus becomes necessary, and energy efficacy at molding is also worse. Further, there is also a problem that a polyimide resin is very expensive.

A fiber-reinforced composite and a carbon fiber-reinforced composite using a ceramic matrix have a defect that they are excellent in heat resistance, but are fragile. In addition, a carbon fiber-reinforced composite also has a problem that a manufacturing step is complicated, and manufacturing is laborsome.

On the other hand, in a heat-resistant fiber-reinforced composite, as a reinforcing fiber, a heat-resistant fiber is used, a representative which is an aramid fiber. However, the aramid fiber has a problem that it has not necessarily high adherability with other organic polymers. Besides, the aramid fiber simultaneously has natures which are not preferable depending on use purpose, such as high equilibrium moisture content of a fiber (for example, an equilibrium moisture content of aramid fiber composed of a para-system homopolymer is about 7%), easy deterioration with ultraviolet-ray, and easy fibrillation in a certain type.

Various modification proposals have been made for compensating for these disadvantageous natures. For example, a method of modifying a polymer structure itself by copolymerizing a third component of an ether system, a method of adding a modifying substance to a spinning dope at spinning, a method of etching a surface of the resulting fiber with excimer laser, a method of injecting a metal by an ion beam, and a method of introducing a modifying substance into a fiber using a supercritical fluid have been previously proposed.

However, in the method of copolymerizing a polymer itself, although some extent of a low equilibrium moisture content and prevention of fibrillation can be realized, improvement of other functions can not be expected, and there was a problem of, for example, deterioration in heat-resistant dimensional stability. In addition, in the method of adding a modifying substance to a spinning dope, there was a problem that a substance to which the method can be applied is extremely limited due to speciality of a spinning solvent, and only coloring with a pigment can be industrially realized. Effect of improving adherability is insufficient even by etching of a fiber surface with excimer laser, treatment with a supercritical fluid is still in a region at a laboratory level, and a range of substances which can be introduced was limited. Like this, all methods have not sufficient effects, and are restrictive means for a limited purpose, and a modifying method leading to improvement in general-use function has not been known.

Various heat-resistant fibers other than aramid fiber have problems, a part of which is common with the aforementioned problems of aramid fiber. And, also in these fibers, a modifying method leading to improvement in general-use function has not been known.

DISCLOSURE OF THE INVENTION

An object of the present invention is to provide a fiber-reinforced composite having excellent heat resistance and toughness. Another object of the present invention is to provide a fiber-reinforced composite which can be simply prepared under low temperature condition using a comparatively inexpensive material. Other object of the present invention is to provide a heat-resistant fiber having an improved surface structure, more specifically, to provide an aramid fiber which has a low equilibrium moisture content, is excellent in adherability with other organic polymer, has improved cut resistance and abrasion resistance, and has a modified surface structure.

In order to attain the aforementioned objects, the present inventors intensively studied, and as a result, obtained findings that, by covering a heat-resistant fiber with a siloxane polymer, a surface structure of a heat-resistant fiber can be modified and, as a result, an equilibrium moisture content can be reduced, adherability with other organic polymer can be improved, cut resistance and abrasion resistance can be improved, fibrillation can be prevented, and a fiber can be protected from ultraviolet-ray. In addition, the present inventors intensively studied, and as a result, obtained findings that, by using siloxane polymer as a matrix resin and a heat-resistant fiber as a reinforcing fiber for reinforcing a siloxane polymer, a fiber-reinforced composite having excellent heat resistance and toughness can be provided.

The present inventors further continued to study, which resulted in completion of the present invention.

That is, the present invention relates to:

(1) a composite comprising a heat-resistant fiber and a siloxane polymer, (2) the composite according to (1), wherein the siloxane polymer is a crosslinked siloxane polymer obtainable by polycondensing a siloxane compound mainly of the following formula (1):

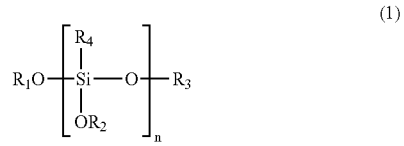

(wherein n represents an integer of 2 to 10; $R_1$, $R_2$, $R_3$ and $R_4$ may be each the same or different, and represent a hydrogen atom or an alkyl group of 1 to 4 carbon atoms; and $R_2$ and $R_4$ may be each the same or different every repetition unit), (3) the composite according to (1) or (2), wherein the heat-resistant fiber is one or more kinds of fibers selected from the group consisting of a wholly aromatic polyamide fiber, a wholly aromatic polyester fiber, a polyparaphenylene benzobisoxazole fiber, a fluorine fiber, a carbon fiber, a glass fiber and a quartz fiber, (4) the composite according to (1) or (2), wherein the heat-resistant fiber is a polyparaphenylene terephthalamide fiber, (5) a process for preparing a composite comprising a heat-resistant fiber and a siloxane polymer, which comprises coating or impregnating a heat-resistant fiber with a solution containing a compound represented by the following formula (1):

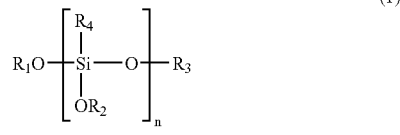

(wherein n represents an integer of 2 to 10; $R_1$, $R_2$, $R_3$ and $R_4$ may be each the same or different, and represent a hydrogen atom or an alkyl group of 1 to 4 carbon atoms; and $R_2$ and $R_4$ may be each the same or different every repetition unit), a catalyst for curing the compound represented by the formula (1) and, optionally, reaction water, and curing the compound represented by the formula (1), (6) the process according to (5), wherein the solution further contains at least one kind of a compound selected from the group consisting of a compound represented by the formula (2):

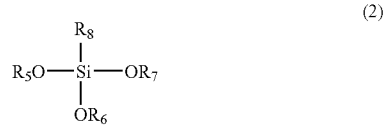

(wherein $R_5$, $R_6$ and $R_7$ may be each the same or different, and represent a hydrogen atom, an alkyl group of 1 to 10 carbon atoms, an alkenyl group of 2 to 10 carbon atoms or a $C_{1-6}$alkoxy-$C_{1-4}$alkyl group, and $R_8$ represents an alkyl group of 1 to 10 carbon atoms, an alkenyl group of 2 to 10 carbon atoms or an aryl group of 6 to 20 carbon atoms, and one or more hydrogen atoms of each of said groups may be substituted with an epoxy group, a glycidyl group, an amino group, a methacryl group, an acryl group, an ureido group, a mercapto group or an isocyanate group directly or via an intervening group), a condensate in which two or more molecules of the compound represented by the formula (2) are condensed (provided that the compound represented by the formula (1) is excluded), a compound represented by the formula (3):

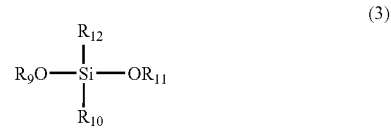

(wherein $R_9$, $R_{10}$, $R_{11}$ and $R_{12}$ may be each the same or different, and represent a hydrogen atom, an alkyl group of 1 to 10 carbon atoms or an alkenyl group of 2 to 10 carbon atoms, and among them, one or both of $R_{10}$ and $R_{12}$ may be an alkyl group of 1 to 10 carbon atoms, an alkenyl group of 2 to 10 carbon atoms or an aryl group of 6 to 20 carbon atoms, one or more hydrogen atoms of each of said groups may be substituted with an epoxy group or a glycidyl group directly or via an intervening group), and a condensate in which two or more molecules of the compound represented by the formula (3) are condensed, (7) a fiber-reinforced glass comprising a heat-resistant fiber and a siloxane polymer as a constituent component, (8) a heat-resistant fiber covered with a siloxane polymer, (9) the heat-resistant fiber according to (8), wherein the heat-resistant fiber covered with a siloxane polymer has a tape-like yarn form,

(10) An aramid fiber covered with a siloxane polymer, characterized in that an aramid fiber containing moisture at an equilibrium moisture content or larger is impregnated or coated with a coating solution in which a compound represented by the formula (1), and an organic compound which is hydrolyzable and whose hydrolysate contains a metal serving a catalyst for curing the compound are dissolved in a substantially anhydrous solvent, and the organic solvent is removed and, at the same time, the compound is cured utilizing the moisture in the aramid fiber as reaction water.

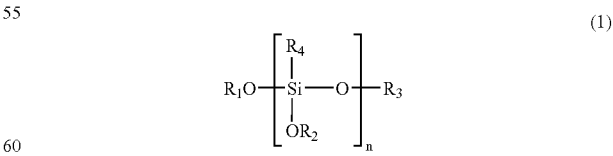

(wherein n represents an integer of 2 to 10; $R_1$, $R_2$, $R_3$ and $R_4$ may be each the same or different, and represent a hydrogen atom or an alkyl group of 1 to 4 carbon atoms, and $R_2$ and $R_4$ may be each the same or different every repetition unit).

BEST MODE FOR CARRYING OUT THE INVENTION

Figure 1:
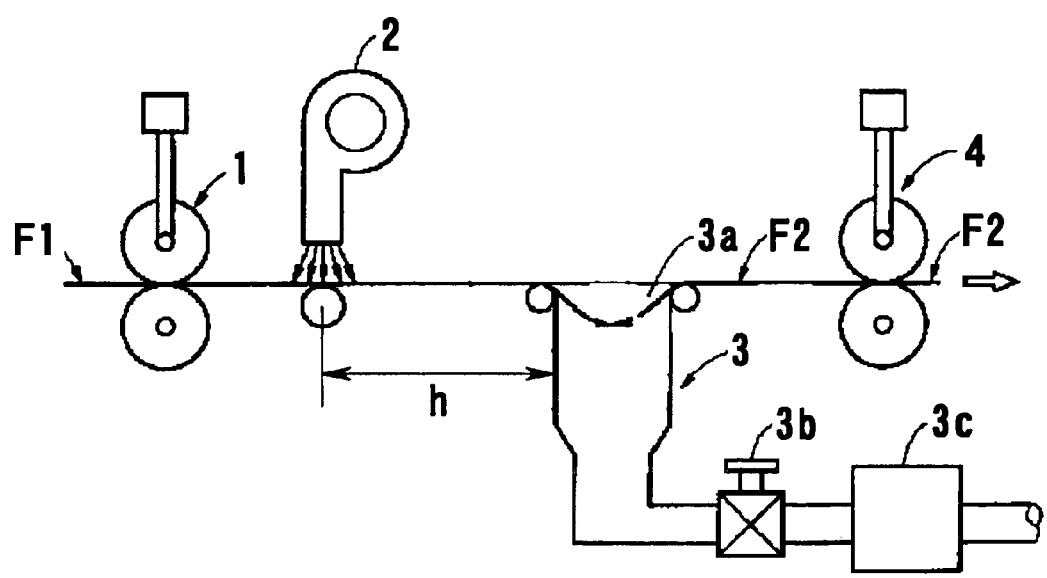
FIG. 1 is a schematic view of an apparatus for performing opening treatment of the present invention. Symbols in the drawing represent as follows; 1: front feeder, 2: heating means, 3: air duct means, 3A: suction port, 3b: air stream control valve, 3c: vacuum pump, 4: back feeder, F1: multifilament, F2: split high functional fiber tape-yarn, h: heat-resistant soft region.

The heat-resistant fiber constituting the composite of the present invention is not particularly limited as far as it is a fiber which can stand a curing temperature for a siloxane polymer, but a fiber having a melting point of 200° C. or higher is preferable, and a fiber substantially having no melting point and having a thermal degradation temperature of about 400° C. or higher is particularly preferable. "Substantially having no melting point" refers to "showing no clear peak in differential scanning calorimetry (DSC)". In addition, a melting point and a thermal degradation temperature can be measured by JIS K 7120:1987 thermogravimetry of a plastic.

The heat-resistant fiber used in the present invention is not particularly limited as far as it satisfies the aforementioned conditions, but the known fibers may be used. Examples of the heat-resistance fiber include polyamide fibers such as cotton and nylon, polyester fibers and acryl fibers. Examples of the heat-resistant fiber substantially having no melting point and having a thermal degradation temperature of about 400° C. or higher include wholly aromatic polyamide fiber, a wholly aromatic polyester fiber, polyparaphenylene benzobisoxazole fiber (hereinafter, referred to as PBO fiber), a polybenzimidazole fiber, a polyamidoimide fiber, a polyimide fiber, a carbon fiber, a fluorine fiber, a glass fiber and a quartz fiber. As the wholly aromatic polyamide fiber, there are a meta-linked wholly aromatic polyamide fiber and a para-linked wholly aromatic polyamide fiber. Examples of the meta-linked wholly aromatic polyamide fiber include a polymetaphenylene isophthalamide fiber. Examples of the para-linked wholly aromatic polyamide fiber include a polyparaphenylene terephthalamide fiber and a copolyparaphenilene-3,4'-diphenylether terephthalamide fiber. Examples of the carbon fiber include a polyacrylonitrile (PAN)-based carbon fiber, a pitch-based carbon fiber, and a vapor phase growth carbon fiber, and a PAN-based carbon fiber from which a high strength is easily obtained is preferable. The glass fiber is roughly classified into alkali-free type and alkali-containing type depending on an alkali content, and in the present invention, any type may be used, but an alkali-containing type is preferable since it has chemical resistance.

The heat-resistant fiber used in the present invention can be easily prepared by the known method, or commercially available heat-resistant fibers may be appropriately used. Examples of the PAN-based carbon fiber include trade name: TORAYCA manufactured by Toray Industries, Inc. Examples of the polyparaphenylene terephthalamide fiber include trade name: KEVLAR (registered trademark) manufactured by DU PONT-TORAY CO., LTD and trade name: Twaron (registered trademark) manufactured by Teijin Twaron; examples of the copolyparaphenylene-3,4'-diphenylether terephthalamide fiber include trade name: Technora (registered trademark) manufactured by Teijin Limited. Examples of the polymetapheyleneisophthalamide fiber include trade name: NOMEX (registered trademark) manufactured by Du Pont and trade name: Conex (registered trademark) manufactured by Teijin Limited. Examples of the wholly aromatic polyester fiber include trade name: Vectran (registered trademark) manufactured by Kuraray Co., Ltd.; examples of the POB fiber include trade name: XYRON (registered trademark) manufactured by Toyobo Co., Ltd.; examples of the polyamidoimide fiber include trade name; Kermel (registered trademark) manufactured by Rohne-Poulenc. As the quartz fiber, for examples quartz fibers such as trade name: Quartzel manufactured by Saint-Gobain Quartz S.A.S.

In the present invention, only one kind of a heat-resistant fiber may be used, or arbitrary two or more kinds of heat-resistant fibers may be used by combining them. When two or more kinds of heat-resistant fibers are combined, it is preferable to combine two or more kinds of heat-resistant fibers substantially having no melting point and having a thermal degradation temperature of about 400° C. or higher, or combine a heat-resistant fiber substantially having no melting point and having a thermal degradation temperature of about 400° C. or higher and other heat-resistant fiber and for example, polyester, nylon or polyvinyl alcohol-based fiber. In the case of the latter, it is preferable that a ratio of a heat-resistant fiber substantially having no melting point and having a thermal degradation temperature of about 400° C. or higher is about 50% by weight or larger, preferably about 70% by weight or larger, more preferably about 90% by weight or larger. Inter alia, in the present invention, it is more preferable to use only a heat-resistant fiber substantially having no melting point and having a thermal degradation temperature of about 400° C. or higher, and it is particularly preferable to use a polyparaphenyleneterephthalamide fiber.

The heat-resistant fiber used in the present invention may have any form. For example, the heat-resistant fiber of the present invention may be a staple yarn or a filament yarn. The filament yarn may be a monofilament, or a multifilament composed of a plurality of monofilaments. The known treatment such as twisting, knitting, opening and crimping may be added to these threads. In addition, the heat-resistant fiber relating to the present invention maybe a composite fiber obtained by slivering, twisting or knitting a plurality of staple yarns or filament yarns. Further, the heat-resistance fiber relating to the present invention may be in the form of a fabric. Examples of the fabric include woven fabric, knitted fabric, square net, square laminated net, multiaxial laminated net and non-woven fabric. Examples of the woven fabric include fabrics obtained by plain weave, satin weave, twill weave, weft striped weave, leno cloth or basket weave. Examples of the knitted fabric include fabrics obtained by flat knitting such as, plain stitch, rib stitch and pearl stitch, warp knitting such as single denbigh stitch, or lace stitch. Examples of the non-woven fabric include a sheet-like structure obtained by chemically, physically or thermally adhering or entangling web fibers without weaving or knitting a web which is an aggregate of fibers, including so-called felt. Alternatively, the heat-resistant fiber relating to the present invention may be in the form of a paper.

A siloxane polymer constituting the composite of the present invention is not particularly limited as far as it is a polymer having a siloxane bond (Si—O bond), but a polymer in which siloxane bonds are continuously linked is preferable. In a siloxane polymer, a hydrogen atom or an organic group may be bound to a bond of a silicon atom which is not bound to an oxygen atom. Examples of the organic group include an alkyl group of 1 to 10 carbon atoms, preferably 1 to 6 carbon atoms; a cycloalkyl group of 3 to 10 carbon atoms, preferably 3 to 7 carbon atoms; an alkenyl group of 2 to 10 carbon atoms, preferably 2 to 6 carbon atoms; an alkynyl group of 2 to 10 carbon atoms, preferably 2 to 6 carbon atoms; an aryl group of 6 to 20 carbon atoms, preferably of 6 to 14 carbon atoms; and a $C_{1-6}$alkoxy-$_{1-4}$alkyl group.

The alkyl group of 1 to 10 carbon atoms may be linear or branched, and such alkyl group includes methyl, ethyl, propyl, isopropyl, butyl, sec-butyl, isobutyl, tert-butyl, pentyl, isopentyl, tert-pentyl, neopentyl, hexyl, isohexyl, 3,3-dimethylbutyl, heptyl, 1-propylbutyl, octyl, nonyl, decyl, etc.

Examples of the cycloalkyl group of 3 to 10 carbon atoms include cyclopropyl, cyclobutyl, cyclopentyl, cyclohexyl, etc.

The alkenyl group of 2 to 10 carbon atoms may be linear or branched, and such alkenyl group includes vinyl, isopropenyl, 1-butenyl, 2-butenyl, 3-butenyl, butadienyl, 2-methylallyl, hexatrienyl, 3-octenyl, etc.

Examples of the alkynyl group of 2 to 10 carbon atoms may be linear or branched, and such alkynyl group includes propargyl, 2-butyn-1-yl, 3-butyn-2-yl, etc.

Examples of the aryl group of 6 to 20 carbon atoms include phenyl, 1- or 2-naphthyl, biphenyl, 1-, 2- or 9-anthryl, 1-, 2-, 3-, 4-or 9-phenanthryl, acenaphthyl, anthracenyl, azulenyl, etc.

Examples of the $C_{1-6}$alkoxy-$_{1-4}$alkyl group include a group in which a linear or branched $C_{1-4}$alkyl group is bound to a linear or branched $C_{1-6}$alkoxy group. Examples of the $C_{1-6}$alkoxy moiety include methoxy, ethoxy, propoxy, isopropoxy, butoxy, tert-butoxy, pentyloxy, tert-pentyloxy, hexyloxy, etc. Examples of the $C_{1-4}$alkyl moiety include methyl, ethyl, propyl, isopropyl, butyl, sec-butyl, isobutyl, etc.

The aforementioned alkyl group, cycloalkyl group, alkenyl group, alkynyl group, aryl group and $C_{1-6}$alkoxy-$C_{1-4}$alkyl group may have a substituent which is chemically acceptable. Examples of the substituent include a halogen atom, a $C_{1-6}$alkoxy group, a $C_{2-6}$alkenyloxy group, a $C_{2-6}$alkynyloxy group, a $C_{1-6}$alkylthio group, a $C_{2-6}$alkenylthio group, a $C_{2-6}$alkynylthio group, a $C_{1-6}$haloalkoxy group, a $C_{2-6}$haloalkenyloxy group, a $C_{1-6}$haloalkylthio group, a $C_{2-6}$haloalkenylthio group, a nitro group, a hydroxyl group, a mercapto group, a cyano group, an epoxy group, a glycidyl group, etc. The number of substituents is not particularly limited as far as it is a replaceable number, but is preferably 1 to 6, more preferably 1 to 3.

It is preferable that a siloxane polymer constituting the composite of the present invention is a crosslinked siloxane polymer obtained by polycondensing a siloxane compound mainly of the following formula (1):

$$R_1O\text{-}\!\!\left[\begin{array}{c}R_4\\|\\Si\\|\\OR_2\end{array}\!\!\text{-}O\right]_{\!n}\!\!\text{-}R_3 \quad (1)$$

(wherein n represents an integer of 2 to 10; $R_1$, $R_2$, $R_3$ and $R_4$ may be each the same or different, and represents a hydrogen atom or an alkyl group of 1 to 4 carbon atoms; and $R_2$ and $R_4$ may be each the same or different every repetition unit).

Herein, the alkyl group of 1 to 4 carbon atoms may be linear or branched, and examples include methyl, ethyl, propyl, isopropyl, butyl, sec-butyl, etc.

In addition to the siloxane compound represented by the formula (1), the siloxane polymer in the present invention may contain a siloxane compound represented by the formula (2):

$$R_5O\text{-}\!\!\begin{array}{c}R_8\\|\\Si\\|\\OR_6\end{array}\!\!\text{-}OR_7 \quad (2)$$

(wherein $R_5$, $R_6$ and $R_7$ may be each the same or different, and represent a hydrogen atom, an alkyl group of 1 to 10 carbon atoms, an alkenyl group of 2 to 10 carbon atoms or a $C_{1-6}$alkoxy-$C_{1-4}$alkyl group, and $R_8$ represents (a) an alkyl group of 1 to 10 carbon atoms, (b) an alkenyl group of 2 to 10 carbon atoms, or (c) an aryl group of 6 to 20 carbon atoms, and one or more hydrogen atoms of each of said groups (a)-(c) may be substituted with an epoxy group, a glycidyl group, an amino group, a methacryl group, an acryl group, an ureido group, a mercapto group or an isocyanate group directly or via an intervening group), or a polycondensate in which two or more molecules of the compound of the formula (2) are condensed (provided that the compound represented by the formula (1) is excluded).

Herein, when $R_8$ is an aryl group of 6 to 20 carbon atoms, a phenyl group is particularly preferable. Examples of the "intervening group" include an alkylene group of 1 to 6 carbon atoms, —O—, —S—, —CO—, —COO—, —CONH—, —CSNH—, —SO$_2$—, —SO—, —OO—, and —SS—. Examples of an epoxy group include 3,4-epoxycyclohexyl. The glycidyl group is a substituent represented by the following formula:

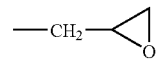

The methacryl group is a substituent represented by the following formula: —CO—C(CH$_3$)=CH$_2$, the acryl group is a substituent represented by the following formula: —CO—CH=CH$_2$, the ureido group is a substituent represented by the following formula: —NHCONH$_2$, and the isocyanate group is a substituent represented by the following formula: —N=C=O. Examples of $R_8$ include preferably an aryl group of 6 to 20 carbon atoms, more preferably a phenyl group; an alkenyl group of 2 to 10 carbon atoms, more preferably a vinyl group; an alkyl group of 1 to 10 carbon atoms, preferably 1 to 6 carbon atoms wherein one or more of hydrogen atoms are substituted with an epoxy group, a glycidyl group, an amino group, a methacryl group, an acryl group, an ureide group, a mercapto group or an isocyanate group directly or via an intervening group. Examples of the substituent of an alkyl group of 1 to 10 carbon atoms include an epoxy group, an amino group, an ureide group, a mercapto group and an isocyanate group, or more preferably a glycidyl group, a methacryl group, and an acryl group which are linked to an alkyl group via an intervening group, particularly —O—. The number of substituents is preferably 1 to 3, more preferably 1 or 2, particularly preferably 1.

Further, in addition to the siloxane compound represented by the formula (1) or in addition to the siloxane compound represented by the formula (1) and the siloxane compound represented by the formula (2) or a condensate thereof, the siloxane polymer of the present invention may contain a siloxane compound represented by the formula (3):

(3)

(wherein $R_9$, $R_{10}$, $R_{11}$ and $R_{12}$ may be each the same or different, and represent a hydrogen atom, an alkyl group of 1 to 10 carbon atoms or an alkenyl group of 2 to 10 carbon atoms, and among them, any one or both of $R_{10}$ and $R_{12}$ may be (a) an alkyl group of 1 to 10 carbon atoms, (b) an alkenyl group of 2 to 10 carbon atoms or (c) an aryl group of 6 to 20 carbon atoms, one or more hydrogen atoms of each of said groups being optionally substituted with an epoxy group or a glycidyl group directly or via an intervening group), or a condensate in which two or more molecules of the compound of the formula (3) are condensed.

Herein, when $R_{10}$ or $R_{12}$ is an aryl group of 6 to 20 carbon atoms, a phenyl group is particularly preferable. In addition, the "intervening group" is as defined above.

The composite of the present invention may contain components other than the heat-resistant fiber and the siloxane polymer as far as those components are not against the object of the present invention. Examples of the other components include a pigment, an antioxidant, a light stabilizer, an ultraviolet absorbent, an antistatic, an electromagnetic wave absorbent, a flame-retardant, an antibacterial agent, an anti-fungal agent and a deodorant.

The composite of the present invention can take various forms depending on the ratio of the heat-resistance fiber and the siloxane polymer to be contained. When a ratio of the siloxane polymer to be contained relative to the heat-resistant fiber is small, a state is realized in which the heat-resistant fiber is covered with the siloxane polymer. As a result, the composite of the present invention is rich in flexibility, and has the same form as a form possessed by a heat-resistant fiber such as a thread, a fabric and a paper. On the other hand, when a ratio of the siloxane polymer to be contained relative to the heat-resistant fiber is large, the siloxane polymer becomes a matrix, and the heat-resistant fiber plays a role as a reinforcing fiber for reinforcing the siloxane polymer. As a result, the composite of the present invention can have flexibility possessed by the heat-resistant fiber no longer, and becomes a reinforced glass having a more hardness than a fiber, in the form of a plate-like or bar-like fiber.

In the composite of the present invention, a ratio of the heat-resistant fiber and the siloxane polymer to be contained can be appropriately selected depending on use purpose. For example, when the composite of the present invention is used as a fibrous product such as a fiber, a thread, a fabric and a paper, an amount of the siloxane polymer to be adhered is about 0.1 to 20% by weight, preferably about 1 to 10% by weight of a total weight of a fiber. In particular, when covering with the siloxane polymer is for the purpose of modifying a surface of a fiber, an amount of the siloxane polymer to be adhered may be small, and about 0.1 to 10% by weight of a total amount of a fiber is preferable. On the other hand, when covering with the siloxane polymer is for the purpose of improving cut resistance and abrasion resistance of a fiber, an amount of the siloxane polymer to be adhered relative to a total weight of a fiber is preferably about 1 to 20% by weight, more preferably about 3 to 15% by weight. On the other hand, when the composite of the present invention is used as a fiber-reinforced glass, Vf (Fiber Volume vol %) after curing is about 39 to 88 vol %, more preferably about 50 to 70 vol %. Vf represents a fiber volume content of the siloxane polymer after curing.

The composite of the present invention can be prepared by combining a heat-resistance fiber and a siloxane polymer. Specifically, the composite of the present invention is particularly preferably prepared using a sol-gel method. Since the composite can be formed at a relatively low temperature according to the sol-gel method, there is an advantage that oxidative degradation of a fiber occurs with difficulty. In addition, there is also an advantage that introduction of a heat-resistant apparatus is not necessary, and energy efficacy at molding is better.

The sol-gel method is a method of dissolving an alkoxysilane in a solvent such as alcohol, adding a catalyst and optionally reaction water thereto, aging it, coating or impregnating a heat-resistant fiber with the resulting siloxane polymer forming solution, drying this, and warming or heating this to form a network of siloxane-bonds. In this case, a siloxane bonds (≡Si—O—Si≡) is produced via a reaction shown in the following reaction equation 1 (1) to (3). Since the siloxane polymer forming solution used in such method has high impregnating property, covering of the siloxane polymer is formed on surfaces of substantially all constituent fibers, even when a heat-resistant fiber takes a form of a fabric or a paper.

<Reaction Equation 1>

 (1)

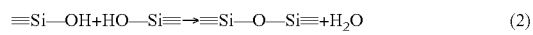 (2)

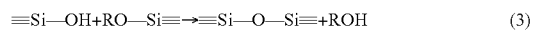 (3)

Respective components contained in the siloxane polymer forming solution will be described in detail below.

As a catalyst used in the above sol-gel method, catalysts which are generally used can be used without special limitation. Examples of the catalyst include an acid and an alkali. More specifically, examples of the acid catalyst include hydrochloric acid, nitric acid, sulfuric acid, phosphoric acid, formic acid and acetic acid. Examples of the base catalyst include ammonia, tetramethylammonium hydroxide, 2-hydroxyethyltrimethylammonium hydroxide, ethanolamine, diethanolamine and triethanolamine.

In addition, examples of the above catalyst include a hydrolyzable organic metal compound. As described below, it is more preferable to use a hydrolyzable organic metal compound as a catalyst. That is, when a hydrolyzable organic metal compound is mixed with an alkoxysilane to obtain a siloxane polymer forming solution, and this is applied to a heat-resistant fiber, this absorbs water on a fiber or/and water (moisture) in the air, and an organic metal compound itself is hydrolyzed. Thereupon, the organic metal compound forms a network with the alkoxysilane, and has a role in promoting curing and solidification of alkoxysilanes.

As an example, when for example tetrabutoxy titanium is used as a hydrolyzable organic metal compound, a reaction of producing a network of siloxane bonds proceeds, even if reaction water is not contained in a siloxane polymer forming solution. The reaction in this case is as shown in (4) and (5) in the following reaction equation 2 in detail.

<Reaction equation 2>

  (4)

  (5)

As described above, by introduction of a ≡Ti—O bond into a covering, a mechanical strength such as heat resistance and abrasion resistance can be further improved as compared with a covering of only a siloxane bond. In addition, when a hydrolyzable organic metal compound is used as a catalyst, there is also an advantage that long term storage stability is improved, because it is not necessary that reaction water is present in a siloxane polymer forming solution.

As used herein, a hydrolyzable organic metal compound does not refer to an organic metal compound which is strictly defined in the field of organic chemistry, but also includes a metal alcoholate and a metal acid ester, and preferable examples include an organic metal compound containing one or more elements selected from the group consisting of titanium, zirconium, aluminum and tin. Specifically, such organic metal compounds include metal acid esters of titanium, zirconium and aluminum, and organic tin compounds, and more specific examples include tetrapropoxy titanate, tetrabutoxy titanate, tetrapropoxy zirconate, tetrabutoxy zirconate, tripropoxy aluminate, aluminum acetylacetonate, dibutyltin diacetate and dibutyltin dilaurate.

In the present invention, it is particularly preferable to use a compound represented by the following formula (1):

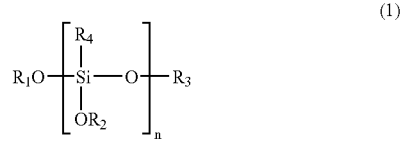  (1)

(wherein n, $R_1$, $R_2$, $R_3$ and $R_4$ are each the same as defined above) as an alkoxysilane in the sol-gel method.

The aforementioned compound contains one of four substituents of a silicon atom which is substituted with a non-hydrolyzable substituent, as a repetition unit, as shown in the formula (1). When such compound is used, since the number of siloxane bonds which are firm between adjacent silicon atoms is small by one as compared with a compound in which all of four substitutents of a silicon atom are hydrolyzable substituents, and at least one of substituents of a silicon atom is not incorporated into a network structure, and an end thereof is cut, this can give flexibility to a coating film of a siloxane polymer, and can give toughness to a matrix of a siloxane polymer. In addition, since $R_4$ in the formula (1) is not hydrolyzed even when the compound of the formula (1) undergoes hydrolysis polycondensation reaction thereof, this gives organic property to a coating film or a matrix of a siloxane polymer and, as a result, can give water repellency to a coating film or a matrix of a siloxane polymer, A raw material (monomer) for obtaining a compound of the formula (1) is inexpensive, and can be purchased at the same degree of cheapness of that of tetraalkoxysilane which is strong in inorganic property. Therefore, by using the compound of the formula (1), a siloxane polymer having sufficient organic properties and a sufficient strength can be formed without daring to use an expensive so-called silane coupling agent.

The compound represented by the formula (1) can be obtained by condensing a monomer (e.g. methyltrimethoxysilane). A repetition unit of a main chain is n=2 to 10 because, when n=1, that is, a monomer is used, a time is necessary for polymerization, and it becomes difficult to form a siloxane polymer having a sufficient strength in a short time. However, if n is 11 or larger, conversely, and when a fiber material is coated or impregnated, the number of alkoxy groups for polymerization on a fiber material is deficient, and it becomes difficult to form a siloxane polymer having a sufficient strength. Therefore, in the present invention, preferable is a condensate of n=about 2 to 10, inter alia, n=about 2 to 8.

When a condensate of the formula (1) is generally synthesized from a monomer, it is fairly difficult in fact from a technical viewpoint to correctly control a polymerization degree thereof. Therefore, inclusion of a condensate of n=2 to 10, preferably n=2 to 8 in the present invention means that, from a distribution of a polymerization degree, a condensate of n=around 2 to 10, preferably around 2 to 8 is mainly contained. For example, inclusion of a compound having n=11 or larger is not excluded.

Specifically, examples of the compound represented by the formula (1) include condensates of methyltrimethoxysilane, ethyltrimethoxysilane, propyltrimethoxysilane, butyltrimethoxysilane, methyltriethoxysilane, ethyltriethoxysilane, propyltriethoxysilane, butyltriethoxysilane, methyltripropoxysilane, and ethyltripropoxysilane. The compound of the formula (1) may be a condensate of only one kind of such monomer, or may be a condensate of two or more kinds of the above-exemplified monomers.

A primary role of a non-hydrolyzable substituent ($R_4$) in the compound of the formula (1) is to impart flexibility to a coating film of a siloxane polymer, and impart toughness to a matrix of a siloxane polymer and, when it is intended to impart water repellency to a coating film or a matrix of a siloxane polymer at the same time, $R_4$ is preferably an alkyl group. Generally, as a carbon number of an organic substituent grows larger, organic property, that is, water repellency is increased. However, when a carbon number grows too large, a strain is generated in a coating film or a matrix due to steric hindrance, and this becomes a cause for reduction in strength of a coating film or a matrix. Therefore, it is preferable that a carbon number of a substituent $R_4$ or a kind or an amount of each monomer constituting the compound of the formula (1) is determined by a preliminary preparation experiment. Since impartment of water repellency to a coating film or a matrix can be also attained by adding a compound of the formula (2) or formula (3) described below, it is not essential that $R_4$ in the formula (1) is an alkyl group.

In the sol-gel method, as alkoxysilane, in addition to the compound represented by the formula (1), a compound represented by the following formula (2):

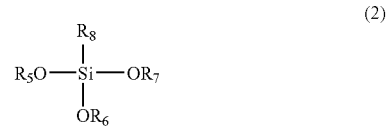  (2)

(wherein $R_5$, $R_6$, $R_7$ and $R_8$ are as defined above) or/and a condensate in which two or more molecules of the compound represented by the formula (2) are condensed (provided that the compound represented by the formula (1) is excluded) may be contained.

Like this, by inclusion of the compound represented by the formula (2) or/and a condensate thereof, nature of organic property possessed by the compound represented by the formula (2) or a condensate thereof can be newly imparted, or nature of organic property can be increased. The compound represented by the formula (2) which is added for such purpose is a compound in which three of four substituents bound to a silicon atom are a hydrolyzable substituent, and the remaining one is a non-hydrolyzable substituent. In the present invention, two or more kinds of the compound represented by the formula (2) may be used. As a condensate, there may be used a condensate obtained by condensing a combination of two or more kinds of a monomer represented by the formula (2). The condensate is preferably a condensate obtained by condensing around 2 to 10 molecules of the compound represented by the formula (2).

Specific examples of the compound represented by the formula (2) include vinyltrimethoxysilane, phenyltrimethoxysilane, γ-(methacryloxypropyl)trimethoxysilane, γ-glycidoxypropyltrimethoxysilane, aminopropyltrimethoxysilane, β-(3,4-epoxycyclohexyl)ethyltrimethoxysilane, vinyltriethoxysilane, phenyltriethoxysilane, γ-(methacryloxypropyl)triethoxysilane, γ-glycidoxypropyltriethoxysilane, aminopropyltriethoxysilane, and vinyltris(β-methoxyethoxy)silane. Examples of a condensate of the compound represented by the formula (2) include a condensate of around 2 to 10 molecules of a monomer of the compound.

In the above sol-gel method, as alkoxysilane, in addition to the compound represented by the formula (1), or in addition to the compound of the formula (1) and the compound of the formula (2) or/and a condensate thereof, a compound represented by the following formula (3):

(wherein $R_9$, $R_{10}$, $R_{11}$ and $R_{12}$ are each the same as defined above) or/and a condensate in which two or more molecules of the compound represented by the formula (3) are condensed may be used.

By further adding the compound of the formula (3) or/and a condensate thereof to a siloxane polymer forming solution, nature of organic property possessed by the compound of the formula (3) or/and a condensate thereof can be newly imparted, or nature of organic property can be increased. The compound represented by the formula (3) is a compound in which two of four substituents bound to a silicon atom are a hydrolyzable substituent, and other two are a non-hydrolyzable substituent. In the present invention, two or more kinds of the compound represented by the formula (3) may be used. In addition, as a condensate, there may be used a condensate obtained by condensing a combination of two or more kinds of monomers represented by the formula (3). The condensate is preferably a condensate obtained by condensing around 2 to 10 molecules of the compound represented by the formula (3).

Specific examples of the compound represented by the formula (3) include dimethyldimethoxysilane, dimethyldiethoxysilane, diethyldimethoxysilane, diethyldiethoxysilane, diphenyldimethoxysilane, diphenyldiethoxysilane, methylvinyldimethoxysilane, and methylvinyldiethoxysilane. Examples of a condensate of the compound represented by the formula (3) include a condensate of around 2 to 10 molecules of a monomer of the above compound.

When the aforementioned compound of the formula (2) or a condensate thereof or the compound of the formula (3) or a condensate thereof is added to a siloxane polymer forming solution, organic property of a siloxane polymer can be increased and, consequently, water repellency of a coating film or a matrix can be improved and, at the same time, a scaffold of a reaction with other organic compound can be provided to a surface of a coating film or a matrix.

It is generally preferable that the compound of the formula (2) or a condensate thereof, or the compound of the formula (3) or a condensate thereof is added to a siloxane polymer forming solution at a total amount in a range not exceeding 50% by weight relative to the compound represented by the formula (1) which is a main component of a siloxane polymer forming solution. If a total amount of both of them to be added exceeds this range, and when a heat-resistant fiber is coated or impregnated with a siloxane polymer forming solution, it does not well bind to the compound represented by the formula (1) which is a main component, and there is a possibility that strength of a coating film or a matrix becomes insufficient in some cases. Thus, the aforementioned range is preferable.

When at least one kind of compounds selected from the group consisting of the compound of the formula (2) and a condensate thereof, as well as the compound of the formula (3) and a condensate thereof is added, in view of reduction in strength of a coating film or a matrix of a siloxane polymer depending on an addition amount, it is preferable that, after a range of an addition amount for attaining the object is revealed by a preliminary preparation experiment, addition is suppressed to a minimum.

A primary role of a non-hydrolyzable substituent ($R_8$, $R_{10}$, $R_{12}$) in the compound of the formula (2) or the compound of the formula (3) is to impart flexibility and water repellency to a coating film of a siloxane polymer, or impart toughness and water repellency to a matrix of a siloxane polymer and, additionally, provide a scaffold for a reaction with other organic compound to a coating film surface or a matrix surface. Further, the substituent may be also utilized as a scaffold for overcoating the known organic or inorganic coating film which has hitherto been used for coating a surface of the glass. Generally, as a carbon number of an organic substituent grows larger, organic property, that is, water repellency is increased. However, when a carbon number grows too large, a strain is generated in a coating film or a matrix due to steric hindrance, and this becomes a cause for reduction in strength of a coating film or a matrix. Therefore, it is preferable that a carbon number of non-hydrolyzable substituents or a kind or an amount of the compound of the formula (2) or the formula (3) is determined by a preliminary preparation experiment.

In the present invention, it is necessary to improve strength of a coating film or a matrix of a siloxane polymer in some cases. In such a case, improvement can be performed by adding a compound represented by the following formula (4):

(wherein $R_{13}$s may be the same or different every substituent, and are a hydrogen atom or an alkyl group of 1 to 10 carbon atoms) to a siloxane polymer forming solution. This may be used as a monomer, or as a condensate.

A siloxane polymer forming solution may contain reaction water, and it is preferable that the solution does not contain reaction water. In this case, moisture in the air or moisture in a fiber is utilized as reaction water for curing the compound represented by the formula (1). Inter alia, it is more preferable that moisture in a fiber is utilized as reaction water because an equilibrium moisture content in a fiber can be reduced.

A solvent used in a siloxane polymer forming solution is not particularly limited as far as a composition is stable, and an example is an alcohol. Specific examples include methanol, ethanol, propanol, isopropanol, butanol, pentanol and hexanol. Further, ketones such as acetone and MEK; ethers such as dioxane and tetrahydrofuran; and toluene may be used. These solvents may be used alone, or by mixing plural kinds of them. In addition, a viscosity of a drying rate of a siloxane polymer forming solution can be adjusted by controlling an addition amount.

In the present invention, when a siloxane polymer forming solution does not contain reaction water, it is preferable to use a substantially anhydrous organic solvent as a solvent. As used herein, "substantially anhydrous" is best if the organic solvent is completely anhydrous. However, the organic solvent can be said to be substantially anhydrous as far as an industrial grade reagent is used, and is handled without positively adding water.

For the purpose of adjusting a viscosity and a drying rate of a siloxane polymer forming solution, it is preferable that organic solvents having a high viscosity or a high boiling point such as glycols (e.g. ethylene glycol, propylene glycol, diethylene glycol, polyethylene glycol, dipropylene glycol, polypropylene glycol, etc.); and cellosolves (e.g. methoxyethanol, propoxyethanol, butoxyethanol, methoxypropanol, ethoxypropanol, propoxypropanol, butoxypropanol, etc.) are used alone or by mixing two or more kinds of them. Of course, the aforementioned alcohols may be added simultaneously with one or more kinds of the aforementioned organic solvents having a high viscosity or a high boiling point. For the purpose of adjusting a viscosity or a drying rate of a siloxane polymer forming solution, not only the aforementioned organic solvent, but also a surfactant may be contained in a siloxane polymer forming solution.

In particular, since the aforementioned glycols or cellosolves have a hydroxy group in their molecule, they may be introduced into a network of a siloxane bond formed by a condensation reaction of the compound of the formula (1) in some cases. Since glycols or cellosolves have organic property, introduction of them increases organic property of the resulting siloxane polymer. Therefore, when it is intended to obtain a siloxane polymer having higher organic property, it is preferable to use glycols or cellosolves as a solvent for the siloxane polymer forming solution.

Further, the siloxane polymer forming solution used in the present invention may contain the known functional substance such as a pigment and an ultraviolet absorbent. Thereby, for example, a functional substance which has hitherto been extremely difficult to be introduced into the interior of a heat-resistant fiber can be dissolved or dispersed in a coating film or a matrix, and additional function can be imparted to a heat-resistant fiber or a fiber-reinforced glass. Thereupon, since a functional substance is localized on a surface of a fiber, for example, in the case of an ultraviolet absorbent, its effect can be doubly increased as compared with the presence of the ultraviolet absorbent in a fiber. As the functional substance, the known functional substances which are used in the field of a fiber can be used without any limitation as far as the object of the present invention is not deteriorated, and such examples include a pigment, an antioxidant, a light stabilizer, a ultraviolet absorbent, an antistatic, an electromagnetic absorbent, a flame-retardant, an antibacterial agent, an anti-fungal agent and a deodorant. Examples of the pigment include inorganic pigments such as titanium oxide, iron oxide and carbon black, and organic pigments such as phthalocyanine blue. Examples of the antioxidant include phenol type antioxidants and amine type antioxidants. Examples of the light stabilizer include hindered amine type light stabilizers. Examples of the ultraviolet absorbent include benzophenone type, benzotriazole type, salicylate type and acrylonitrile type ultraviolet absorbents. Examples of the antistatic include anionic type, cationic type, and nonionic type surfactants. Examples of the flame retardant include various boric acid type flame retardant, phosphorus type flame retardant, inorganic type flame retardant, nitrogen type flame retardant, halogen type flame retardant, organic type flame retardant and colloid type flame retardant.

The composite of the present invention can be prepared by combining the aforementioned siloxane polymer forming solution with a heat-resistant fiber by contacting them, and curing an alkoxysilane, preferably the compound represented by the formula (1) contained in the siloxane polymer forming solution. A way of combining the siloxane polymer forming solution and the heat-resistant fiber can be appropriately selected depending on a form of the composite of the present invention. Specifically, a way of combination will be explained by filament separation into (i) the case where a ratio of a siloxane polymer to be contained relative to a heat-resistant fiber is large, a siloxane polymer becomes a matrix, and a heat-resistant fiber is a reinforcing fiber for reinforcing a siloxane polymer to be in the state of a fiber-reinforced glass (hereinafter, simply referred to as "fiber-reinforced glass"), and (ii) the case where a ratio of a siloxane polymer to be contained relative to a heat-resistant fiber is small, and a heat-resistant fiber is covered with a siloxane polymer (hereinafter, simply referred to as "siloxane polymer-covered fiber").

A method of combining a siloxane polymer forming solution and a heat-resistant fiber is carried out by contacting them in a fiber-reinforced glass according to the known method used in a process for preparing a fiber-reinforced composite. Specific examples of such methods include an impregnation method, a pressure impregnation carbonization method, and a CVD method. The impregnation method is a method of impregnating a substrate composed of a heat-resistant fiber with a siloxane polymer forming solution. The CVD method is a method of sedimenting a siloxane polymer forming solution on a substrate composed of a heat-resistant fiber heated to a high temperature under reduced pressure. In the present invention, it is preferable to use the impregnation method. Examples of the impregnation method include a prepreg method, a filament winding method and an electrodeposition method, and it is more preferable to use a prepreg method.

In the case of the prepreg method, the fiber-reinforced glass relating to the present invention can be obtained by impregnating a substrate composed of a heat-resistant fiber with a siloxane polymer forming solution to obtain a prepreg, subjecting the prepreg to a shaping step such as lamination and winding, and performing heat molding by a method such as press molding, vacuum pack molding, autoclave molding and wrapping molding. A temperature of heat molding is about 150 to 200° C., preferably about 160 to 180° C. Heat molding may be performed under normal pressure, under reduced pressure or under pressure, and it is preferable to perform pressurizing while evacuating as in autoclave molding. After heat treatment, it is preferable to perform cooling gradually.

In the aforementioned process, a substrate composed of a heat-resistant fiber may have any structure or form as far as the substrate is constructed of a heat-resistant fiber, and examples include a one directional material (short fiber, long fiber), a yarn, a woven fabric (biaxial woven fabric, triaxial woven fabric), a knitted fabric, a non-woven fabric, a paper and a mat.

A siloxane polymer-covered fiber can be obtained by impregnating or coating a heat-resistant fiber with the aforementioned siloxane polymer forming solution, and curing an alkoxysilane, preferably the compound represented by the formula (1) in the resulting heat-resistant fiber. Examples of a preferable aspect of a process for preparing a siloxane polymer-covered fiber include a method of impregnating or coating an aramid fiber containing moisture at an equilibrium moisture content or more with a coating solution in which the compound represented by the formula (1), and an organic compound which is hydrolyzable and whose hydrolysate contains a metal as a catalyst for curing the aforementioned compound are dissolved in a substantially anhydrous organic solvent, and removing the organic solvent and, at the same time, curing the compound using the aforementioned moisture in the aramid fiber as reaction water.

When a siloxane polymer forming solution does not contain reaction water, in order to utilize moisture in a fiber as reaction water, a heat-resistant fiber to be covered is preferably a heat-resistant fiber containing moisture at an equilibrium moisture content or larger, particularly, more preferably aramid fiber containing moisture at an equilibrium moisture content or larger. Specifically, a moisture content in a heat-resistant fiber may be adjusted to 50% by weight or smaller, more preferably 20% by weight or smaller relative to a fiber weight. When a moisture content is too high, resulting in ununiform reaction of curing the compound represented by the formula (1), the aforementioned range is preferable. On the other hand, since when a fiber is in the absolutely dry state, a curing reaction becomes slow, it is preferable that moisture is contained at an amount of at least equilibrium moisture content or larger. For example, in the case of aramid fiber, it is preferable that a moisture content is about 7% by weight.

For forming a firm coating film, it is preferable to remove a deposit such as a spinning lubricant, a spinner lubricant and a textile size attached to a heat-resistant fiber by scouring prior to impregnation or coating with the siloxane polymer forming solution. However, removal of these lubricant and finishing agent is not essential requirement for realizing the present invention, the removal is not necessary in some cases, and it is possible to use a composition for taking these components in a polymer structure in a coating film.

Examples of a step of impregnating or coating a heat-resistant fiber with a siloxane polymer forming solution include (a) the case where a yarn-like heat-resistant fiber is impregnated or coated with the siloxane polymer forming solution, and (b) the case where a sheet-like heat-resistant fiber such as a woven fabric, a knitted fabric, a non-woven fabric and a paper is impregnated or coated with the siloxane polymer forming solution.

In the case of (a), a shape of a yarn may be any shape of a filament yarn and a staple yarn. In the case of a filament yarn, modification means of the present invention, that is, a step of forming a coating film of a siloxane polymer on a surface of a heat-resistant fiber can be incorporated immediately after spinning of a fiber spinning step, and modification of a fiber surface with a coating film of a siloxane polymer can be continuously performed after spinning of a fiber. Thus, such modification is effective. For this reason, as a method of impregnation or coating, the known method may be used, but examples of a preferable method include a method of immersing a heat-resistant fiber filament yarn immediately after spinning in a siloxane polymer forming solution. More preferably, there is a method of drying a heat-resistant fiber filament yarn immediately after spinning to a degree of inclusion of moisture at an equilibrium moisture content or larger, and immersing this in a siloxane polymer forming solution.

Also in the case of (b), as a method of impregnation or coating, the known method may be used. Examples of the method include a method of impregnating a sheet composed of a heat-resistant fiber in a siloxane polymer forming solution, and squeezing off an excessive solution. Alternatively, a siloxane polymer forming solution may be wiped or blown to a sheet composed of a heat-resistant fiber using the known equipment such as a sprayer. Further, a sheet composed of a heat-resistant fiber may be covered with a siloxane polymer forming solution using a so-called exclusion covering machine. Specifically, the following method is exemplified. A sheet composed of a heat-resistant fiber is made, and a moisture content of a heat-resistant fiber constituting a sheet is adjusted to the concentration of an equilibrium moisture content or larger. Alternatively, a heat-resistant fiber having a moisture content adjusted as described above may be used to make a sheet. Then, the resulting sheet is impregnated or coated with a siloxane polymer forming solution using the aforementioned method.

Then, in a heat-resistant fiber impregnated or coated with a siloxane polymer forming solution, the compound represented by the formula (1) is cured. Specifically, there is a method of removing a solvent of a siloxane polymer forming solution, and performing hydrolysis of a catalyst and curing of siloxane by reaction water. More specifically, by treatment at a temperature of about 150 to 200° C., preferably about 160 to 180° C., the siloxane polymer forming solution is cured and solidified. Such treatment may be performed under normal pressure, under reduced pressure or under pressure, preferably under normal pressure.

In the present invention, further, the heat-resistant fiber may be subjected to the known treatment. Examples of the known treatment include opening treatment and filament separation treatment. These treatments are described below.

By subjecting a heat-treatment fiber covered with a siloxane polymer to opening treatment, a tape-like yarn composed of a heat-resistant fiber covered with a siloxane polymer is obtained. A width of the tape-like yarn is preferably about 5 to 50 mm.

It is particularly preferable that the heat-resistant fiber which is to be opened and covered with a siloxane polymer has a form of a multifilament composed of plural monofilaments. The multifilament may be such that plural monofilaments are merely slivered, and twisting may be further added. A twisting method may be carried out according to the known methods, and twist direction may be S twist or Z twist. In addition, multifilaments are slivered, and may be once wound, and twisting may be provisional twisting generated upon this winding. The number of monofilaments constituting the multifilament is not particularly limited, but about 5 to 10,000 is preferable. From a viewpoint of easiness of management of a manufacturing step and handling, it is preferable that a diameter of a monofilament constituting the multifilament is about 0.1 to 100 µm.

In the present aspect, a step of covering with a siloxane polymer and an opening step described below in detail may be continuously performed, or after a step of covering with a siloxane polymer, the resulting heat-resistant fiber covered with a siloxane polymer may be once wound and, thereafter, an opening step may be performed. However, it is preferable that a covering step and an opening step are continuously performed. When a covering step and an opening are performed separately, the following is preferable: A multifilament composed of a wound heat-resistant fiber is successively wound off, passed through a bath containing the aforementioned siloxane polymer forming solution, a multifilament impregnated with a siloxane polymer forming solution is heat-treated as described above to form a coating film of a siloxane polymer, and a multifilament covered with a siloxane polymer is rewound again with a winder. At this rewinding step, it is preferable that a winding up rate is slower than a rate of winding up a multifilament initially. Specifically, the winding up rate is preferably about 1 to 100 m/min. Whereby, provisional twisting generated at the previous multifilament winding up, and optionally set twisting are partially or totally untwisted. Opening treatment is performed for expanding a yarn width of a heat-resisitant fiber, particularly, a multifilament. The opening treatment may be performed according to the known method, and examples include opening with a water stream, opening with vibration using a liquid as a medium, opening with procession by pressing with a roll, and opening using an air stream. In the present invention, inter alia, opening using an air stream, in particular, a suction air stream is preferably used.

An apparatus using air opening conducted in the present invention is shown in FIG. 1. In FIG. 1, a symbol F1 denotes a multifilament. This multifilament is a multifilament covered with a siloxane polymer as described above.

A multifilament F1 which is continuously fed from a yarn feeding machine (not shown) in a line-like at a feeding rate of preferably about 1 to 100 m/min, for example, about 5 m/min is taken off by a front feeder 1 constituting a feeder means, and delivered in a back feeder 4 direction by speed control so that an overfeed amount of about 2 cm is generated. Between this front feeder 1 and a back feeder 4 are disposed a hot air blower as a heating means 2 on an upstream side and a suction air duct as an air duct means 3 on a downstream side, and the hot air blower 2 blows a hot air to the multifilament F1 from an upper direction to feed the multifilament F1 into the suction air duct 3. Thereupon, a temperature of the hot air is preferably about 80 to 150° C. In FIG. 1, a heating means 2 is a hot air blower and, for example, a heating hot roll, an ultrasound generator, a radiofrequency induction heater or a ceramic far infrared heater can be used by appropriate selection. Inter alia, it is preferable to use the hot air blower as a heating means 2. The suction air duct 3 is provided with an air stream control valve 3b and a vacuum pump 3c, and a suction air stream is continuously generated in a suction port 3a in the suction air duct 3. And, a speed of the multifilament F1 is controlled by a feeder means composed of a front feeder 1 and a back feeder 4 so that a desired deflection amount is generated in the suction port 3a of the suction air duct. In FIG. 1, an air stream generating apparatus shown by the suction air duct 3 may be an apparatus for pushing out the air in place of the aforementioned apparatus for sucking the air, and an air sucking apparatus is more preferable.

By separating a multifilament composed of a heat-resistant fiber covered with a siloxane polymer in accordance with the present invention, a multifilament having a smaller fineness can be prepared. Depending on a degree of filament separation, a monofilament of a heat-resistance fiber covered with a siloxane polymer can be prepared.

A multifilament composed of a heat-resistant fiber covered with a siloxane polymer to be filament separation-treated may have any form, but it is preferable that it has a form of the aforementioned tape-like yarn from a viewpoint of easy filament separation.

Filament separation treatment can be easily performed according to the known method. For example, filament separation treatment can be performed using the known filament separation machine such as a single-format filament separating machine and a duplicate-format filament separating machine. In addition, in the filament separation treatment, the known conditions may be adopted.

The thus prepared composite of the present invention can be used in various uses depending on its form. For example, when the composite of the present invention has a form of a fiber-reinforced glass, the composite is utilized in uses requiring heat resistance, specifically, aerospace members, sports goods, structural members, printed circuit boards, brakes, and high temperature furnace interior parts. Examples of the sports goods include a golf shaft, a tennis racket, and a fishing rod. Examples of the aerospace member include structural members used in space structures such as an artificial satellite, a rocket, a space shuttle and a space station. Examples of the structural member include exterior members (armor) of civil and military vehicles, that is, a tank, an automobile, a flying object (e.g. helicopter and aircraft), a ship and a railroad car. Other examples include exterior members of houses and cash boxes.

In addition, when the composite of the present invention has a form of a siloxane polymer-covered fiber, in particular, the composite is suitably utilized in uses requiring water repellency and heat resistance. Specifically, the siloxane polymer-covered fiber of the present invention is preferably applied to protecting clothing such as a fire fighting clothing and a working glove. Alternatively, the composite is suitably used as a material constituting a composite material. The composite material is a material which is made by combining two or more kinds of materials for the purpose of exerting a variety of properties (strength, stiffness, toughness, chemical property). As used herein, "combination of materials" means a combination at a size which is sufficiently larger than an atomic level, and includes a material of a combination at an order of µm.

In particular, when the heat-resistant fiber of the present invention has a form of a tape-like yarn, the fiber is suitably used as a material for a composite material which is a phase for one dimensional, two dimensional or three dimensional reinforcement. For example, the above tape-like yarn is used to form a woven fabric and the woven fabric is further impregnated with a resin to prepare a composite material. The resulting composite material is suitably used as a protecting material in the aeronautic field such as a balloon and an airship. Further, a fabric composed of the tape-like yarn may be laminated with an existing synthetic resin film to form a reinforced film material. The film material is also suitably used in the aeronautic filed.

EXAMPLES

The present invention will be explained in further detail below based on Examples, but the present invention is not limited to Examples in such a range that its technical idea extends to.

Example 1

(1) Preparation of Methyltrimethoxysilane (Hereinafter Referred to as "MTMS") Condensate 181 g of MTMS, 50 g of methanol and 18 g of pure water were added to a 500 ml three-neck flask, and the materials were stirred well. Further, 2 g of 61% nitric acid was added, heated to reflux for 3 hours while stirring and, after completion of the reaction, the reactor was evacuated while heating, to remove the methanol. The thus obtained MTMS condensate was found to be mainly composed of a trimer and a tetramer by gas chromatography analysis.

(2) Preparation of Coating Stock Solution 140 g of the resulting MTMS condensate, 50 g of γ-glycidoxypropyltrimethoxysilane and, as a catalyst, 8 g of dibutyltin diacetate were dissolved in 198 g of anhydrous isopropyl alcohol to prepare a coating stock solution.

(3) Formation of Coating Film onto Aramid Fiber (a) Assessment of Improvement in Physical Property of Aramid Fiber Woven Fabric A spun thread (585 dtex) of 20 yarn count (292 dtex) two folded yarn of aramid fiber composed of polyparaphenylene terephthalamide ("KEVLAR(R); DuPont registered trademark)", item K-29 manufactured by Toray DuPont) was used to make a woven fabric at a density of a warp 59/inch and a weft 47/inch, and a twill aramid fiber woven fabric of a weight 235 g/m$^2$ was obtained.

This woven fabric was immersed in a coating solution in which the aforementioned coating stock solution was diluted 20-fold with anhydrous isopropyl alcohol, squeezed at a pressure of 0.15 MPa using a mangle manufactured by Kyoto Machinery, and subjected to dipping procession at a rate of 1 m/min. The woven fabric after procession was air-dried for 30 minutes, and subjected to curing treatment at 150° C. for 10 minutes using a safety oven SHPS-222 manufactured by Tabai Manufacturing Co., Ltd. to obtain a woven fabric on which a coating film was formed at an adhesion rate of 6.5% by weight. Physical properties of the resulting woven fabric are shown in Table 1. Various properties shown in Table 1 were obtained by experiments according to the following methods.

(1) Equilibrium moisture content: The content was measured based on JIS-L1963 (general woven fabric test method 6.9; moisture content test method).

(2) Tensile strength: A warp direction of a woven fabric was tested using an autograph manufactured by Shimadzu Corporation by a strip method at a sample length of 200 mm, a stress rate of 200 mm/min and a sample width of 30 mm according to JIS-L1963 (general woven fabric test method 6.12).

(3) Water repellency: Water repellency was measured according to JIS-L1092 (water proofness test method of fiber product 5.2; water repellency degree (spray test)).

(4) Cut resistance: Cut resistance was measured using a blade (American Safety Razor Co., item No. 88-0121 according to the ISO13997 method.)

(5) Frosting: The woven fabric was abraded with a same fabric for 10 minutes under a load of 750 g using a frosting testing machine manufactured by Daiei Kagaku Seiki MFG Co., Ltd., and the state of whitening was determined at a gray scale. Grade 5 is most excellent, and grade 1 denotes the state of severest (worst) whitening.

TABLE 1

| Measurement item | Unit | Before procession (Comparative Example) | After procession (Example) |
|---|---|---|---|
| Adhesion rate of coating film | % by weight | 0 | 6.5 |
| Equilibrium moisture content | % by weight | 7.2 | 1.1 |
| Tensile strength | N | 2110 | 2465 |
| Water repellency | Grade | 1 | 3 |
| Cut resistance | N | 5.6 | 9.8 |
| Frosting | Grade | 1 | 2-3 |

From the results of Table 1, the coated aramid fiber woven fabric of the present invention has a remarkably reduced equilibrium moisture content and improved surface water repellency as compared with the untreated aramid fiber woven fabric. Further, as shown by the results of a frosting test, it is seen that abrasion resistance is excellent, and excellent cut resistance which is characteristic of aramid fiber is further improved.

(b) Assessment of Improvement in Adherability of Filament Yarn by Microdroplet Method A multifilament of aramid fiber composed of 1,000 filaments having a monofilament diameter of 12 micron ("KEVLAR(R); DuPont registered trademark)" manufactured by Toray DuPont, item K-29) was taken out from a bobbin, and passed through a dipping machine in which a coating solution obtained by diluting the aforementioned coating stock solution 20-fold with anhydrous isopropyl alcohol was placed in a dipping bath. Then, the multifilament was dried at 150° C. for 60 seconds in a non-contact drying zone to remove the solvent, and curing was completed by passing successively through the non-contact heating treatment zone at 250° C. for 60 seconds, and a contact roll at 300° C. for 15 seconds.

One monofilament of the thus obtained coated multifilament was taken out, a sol-like epoxy resin was adhered thereto, curing of an epoxy resin was performed to cure the epoxy resin adhered to a monofilament surface, whereby a single fiber drawing test sample was prepared.

As a control, a single fiber drawing test sample was prepared similarly from the aforementioned multifilament untreated with a coating solution.

Using these single fiber drawing test samples, adherability between the aramid fiber yarn and the epoxy resin was assessed by a single fiber drawing test method (microdroplet method) using a composite material interface property assessing machine manufactured by Toei Sangyo Co., Ltd. The resulting value is an interface shear strength expressing an interface strength.

As a result, a value of a sample obtained from the untreated aramid fiber yarn was 18.6±1.7 MPa, while in a sample obtained from the coating-treated aramid fiber yarn, an interface shear strength was 27.0±2.7 MPa and about 45% improvement of the strength was perceived.

This result means that the aramid fiber yarn and the epoxy resin are adhered firm via a coating film which adheres firm to a fiber surface, and demonstrates that, when the treated aramid fiber yarn of the present invention is used in a reinforcing fiber for a composite material, a connecting strength with a matrix resin can be considerably improved.

Example 2

200 g of a methoxysilane oligomer (polymerization degree; trimer to tetramer) was added to 785 g of isopropyl alcohol, the materials were stirred, 15 g of titanium tetrabutoxide was added, and the materials were sufficiently stirred to prepare a matrix forming solution. This matrix forming solution was impregnated into a triaxial woven fabric composed of 110 dtex polyparaphenylene terephthalamide fiber (KEVLAR (registered trademark) 49 manufactured by Toray DuPont) having a density 18.5/25 mm, a woven fabric weight of 27 g/m² and a weaving tissue of Basic, and air-dried, and a volume content of a matrix forming solution was measured, and found to be GC about 23.9 wt %. GC represents a weight content of a matrix forming solution before curing. Thereafter, thermal treatment at 120° C. for 3 minutes under a normal pressure afforded the aramid fiber-reinforced glass of the present invention. Thereupon, a fiber volume content of a siloxane polymer was Vf84%.

Example 3

The same matrix forming solution as that of Example 2 was impregnated into a triaxial woven fabric composed of a 1K (66 tex) carbon fiber (TORAYCA (registered trademark) T300 manufactured by Toray Industries, Inc.) having a density of 9.24/25 mm, a woven fabric weight of 74 g/m² and a weaving tissue of Basic, and the resulting impregnated fabric was placed on a releasing film, and air-dried gradually. A volume content of a matrix forming solution was measured, and found to be GC about 42.3 wt %. Thereafter, thermal treatment at 200° C. for 30 minutes in an autoclave and gradual cooling afforded the carbon fiber-reinforced glass of the present invention. Thereupon, a fiber volume content of a siloxane polymer was Vf 65.5%.

INDUSTRIAL APPLICABILITY

The composite of the present invention has the following advantages depending on its form.

Since in the siloxane polymer-covered fiber of the present invention, a surface of a heat-resistance synthetic fiber is soft, and is covered with a firm siloxane polymer coating film, cut resistance and abrasion resistance can be improved. There is also an advantage that, when moisture in a fiber is used upon curing of the compound represented by the formula (1), an equilibrium moisture content of a heat-resistant synthetic fiber can be reduced. Further, by adding at least one kind of the compound represented by the formula (2) or the formula (3) or its condensate, a non-hydrolyzable organic substituent can be introduced into a coating film of a siloxane polymer which covers a heat-resistant synthetic fiber, the same scaffold for a reaction with other organic compound as that of a so-called silane coupling agent can be provided on a fiber surface. Therefore, a heat-resistant synthetic fiber can be highly functionalized and, at the same time, a heat-resistant synthetic fiber which can be utilized in various uses which could not be utilized previously due to a problem such as high equilibrium moisture content, low abrasion resistance and low adherability can be obtained.

The fiber-reinforced glass of the present invention has both of excellent heat resistance and toughness, and can solve the problems possessed by the previous fiber-reinforced composite at once. For this reason, the fiber-reinforced glass of the present invention can be suitably used in members which may be exposed to high temperature circumstance at about 1,000° C. or lower, preferably about 500° C. or lower, more preferably 300 to 500° C. In addition, in the fiber-reinforced glass of the present invention, since a fiber bundle of a heat-resistant fiber is highly impregnated with a siloxane polymer, mechanical properties such as a strength and an elastic modulus are also excellent. In addition, in the fiber-reinforced glass of the present invention, since adherability between a siloxane polymer which is a matrix and a heat-resistant fiber at an interface is higher as compared with the previous fiber-reinforced composite, mechanical properties such as a strength and elasticity possessed by a heat-resistant fiber can be sufficiently exerted. Since the fiber-reinforced glass of the present invention can be molded at a relatively low temperature, oxidative deterioration of a heat-resistant fiber at molding can be prevented. In addition, the fiber-reinforced glass of the present invention can be simply prepared using a relatively inexpensive material.

The invention claimed is:

1. A process for preparing a composite comprising a polyparaphenylene terephthalamide fiber and a siloxane polymer, which comprises:
coating or impregnating a polyparaphenylene terephthalamide fiber with a solution consisting of a solvent, a compound represented by the following formula (1):

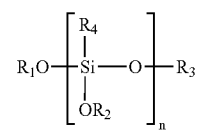

(1)

wherein n represents an integer of 2 to 10; $R_1$, $R_2$, $R_3$ and $R_4$ may be each the same or different, and represent a hydrogen atom or an alkyl group of 1 to 4 carbon atoms; and $R_2$ and $R_4$ may be each the same or different in every repetition unit, and a catalyst for curing the compound represented by the formula (1), wherein the catalyst is an organic metal compound selected from the group consisting of a metal acid ester of titanium, a metal acid ester of zirconium, and an organic tin compound and, optionally, reaction water, and curing the compound represented by the formula (1).

2. A process for preparing a composite comprising a polyparaphenylene terephthalamide fiber and a siloxane polymer, which comprises:
coating or impregnating a polyparaphenylene terephthalamide fiber with a solution consisting of a solvent, a compound represented by the following formula (1):

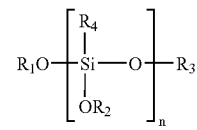

(1)

wherein n represents an integer of 2 to 10; $R_1$, $R_2$, $R_3$ and $R_4$ may be each the same or different, and represent a hydrogen atom or an alkyl group of 1 to 4 carbon atoms; and $R_2$ and $R_4$ may be each the same or different in every repetition unit, a catalyst for curing the compound represented by the formula (1), wherein the catalyst is an organic metal compound selected from the group consisting of a metal acid ester of titanium, a metal acid ester of zirconium, and an organic tin compound, at least one compound selected from the group consisting of a compound represented by the formula (3):

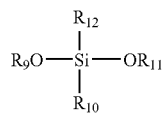 (3)

wherein $R_9$, $R_{10}$, $R_{11}$ and $R_{12}$ may be each the same or different, and represent a hydrogen atom, an alkyl group of 1 to 10 carbon atoms or an alkenyl group of 2 to 10 carbon atoms, and among them, one or both of $R_{10}$ and $R_{12}$ may be an alkyl group of 1 to 10 carbon atoms, an alkenyl group of 2 to 10 carbon atoms or an aryl group of 6 to 20 carbon atoms, one or more hydrogen atoms of each of said groups being optionally substituted with an epoxy group or a glycidyl group directly or via an intervening group, and a condensate in which two or more molecules of the compound represented by the formula (3) are condensed and, optionally, reaction water, and curing the compound represented by the formula (1).

3. The process according to claim 1 or claim 2, wherein the solution does not comprise reaction water.

4. The process according to claim 1 or claim 2, wherein the organic metal compound is selected from the group consisting of tetrapropoxy titanate, tetrabutoxy titanate, tetrapropoxy zirconate, dibutyltin diacetate and dibutyltin dilaurate.

5. The process according to claim 1 or claim 2, wherein the organic metal compound is selected from the group consisting of tetrabutoxy titanate and dibutyltin diacetate.

6. The process according to claim 1 or claim 2, wherein the solution comprises reaction water.

7. A process for preparing a composite comprising a polyparaphenylene terephthalamide fiber and a siloxane polymer, which comprises:

coating or impregnating a polyparaphenylene terephthalamide fiber with a solution consisting of a solvent, a compound represented by the following formula (1):

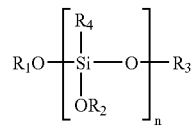 (1)

wherein n represents an integer of 2 to 10; $R_1$, $R_2$, $R_3$ and $R_4$ may be each the same or different, and represent a hydrogen atom or an alkyl group of 1 to 4 carbon atoms; and $R_2$ and $R_4$ may be each the same or different in every repetition unit, a catalyst for curing the compound represented by the formula (1), wherein the catalyst is an organic metal compound selected from the group consisting of a metal acid ester of titanium, a metal acid ester of zirconium, and an organic tin compound, and at least one functional substance selected from the group consisting of a pigment, an antioxidant, a light stabilizer, an ultraviolet absorbent, an antistatic, an electromagnetic absorbent, a flame-retardant, an antibacterial agent, an anti-fungal agent and a deodorant and, optionally, reaction water, and curing the compound represented by the formula (1).

8. A process for preparing a composite comprising a polyparaphenylene terephthalamide fiber and a siloxane polymer, which comprises:

coating or impregnating a polyparaphenylene terephthalamide fiber with a solution consisting of a solvent, a compound represented by the following formula (1):

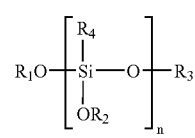 (1)

wherein n represents an integer of 2 to 10; $R_1$, $R_2$, $R_3$ and $R_4$ may be each the same or different, and represent a hydrogen atom or an alkyl group of 1 to 4 carbon atoms; and $R_2$ and $R_4$ may be each the same or different in every repetition unit, a catalyst for curing the compound represented by the formula (1), wherein the catalyst is an organic metal compound selected from the group consisting of a metal acid ester of titanium, a metal acid ester of zirconium, and an organic tin compound, at least one compound selected from the group consisting of a compound represented by the formula (3):

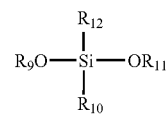 (3)

wherein $R_9$, $R_{10}$, $R_{11}$ and $R_{12}$ may be each the same or different, and represent a hydrogen atom, an alkyl group of 1 to 10 carbon atoms or an alkenyl group of 2 to 10 carbon atoms, and among them, one or both of $R_{10}$ and $R_{12}$ may be an alkyl group of 1 to 10 carbon atoms, an alkenyl group of 2 to 10 carbon atoms or an aryl group of 6 to 20 carbon atoms, one or more hydrogen atoms of each of said groups being optionally substituted with an epoxy group or a glycidyl group directly or via an intervening group, and a condensate in which two or more molecules of the compound represented by the formula (3) are condensed, and at least one functional substance selected from the group consisting of a pigment, an antioxidant, a light stabilizer, an ultraviolet absorbent, an antistatic, an electromagnetic absorbent, a flame-retardant, an antibacterial agent, an antifungal agent and a deodorant and, optionally, reaction water, and curing the compound represented by the formula (1).

* * * * *